US012321108B2

(12) United States Patent
Hayashi et al.

(10) Patent No.: US 12,321,108 B2
(45) Date of Patent: Jun. 3, 2025

(54) IMAGE FORMING APPARATUS

(71) Applicant: CANON KABUSHIKI KAISHA, Tokyo (JP)

(72) Inventors: Kodai Hayashi, Shizuoka (JP); Issei Imamura, Shizuoka (JP); Shinichi Agata, Shizuoka (JP); Takuya Oka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/856,265

(22) Filed: Jul. 1, 2022

(65) Prior Publication Data

US 2023/0010866 A1 Jan. 12, 2023

(30) Foreign Application Priority Data

Jul. 2, 2021 (JP) ................................ 2021-110887

(51) Int. Cl.
*G03G 15/06* (2006.01)
*G03G 15/00* (2006.01)
*G03G 15/08* (2006.01)

(52) U.S. Cl.
CPC ....... *G03G 15/065* (2013.01); *G03G 15/0808* (2013.01); *G03G 15/5008* (2013.01)

(58) Field of Classification Search
CPC ............ G03G 15/065; G03G 15/0808; G03G 15/5008
See application file for complete search history.

(56) References Cited

U.S. PATENT DOCUMENTS 5,628,043 A * 5/1997 Ikeda ..................... G03G 13/08 399/236
5,778,286 A 7/1998 Kido et al.
6,374,065 B1 4/2002 Nishimura et al.
(Continued)

FOREIGN PATENT DOCUMENTS

CN 1474238 A 2/2004
CN 1716129 A 1/2006
(Continued)

OTHER PUBLICATIONS

Machine translation of Kaino (2014).*
(Continued)

*Primary Examiner* — Sevan A Aydin
(74) *Attorney, Agent, or Firm* — Venable LLP

(57) ABSTRACT

An image forming apparatus includes an image bearing member, a developer bearing member, a drive unit for driving the image bearing member and the developer bearing member in varied peripheral speeds, a control unit, a developing voltage application unit, a supply member for supplying a developer to the developer bearing member, and a supply member voltage application unit. The control unit executes a first image forming mode in which a rotational peripheral speed ratio between surface movement speeds of the developer bearing member and the image bearing member is not greater than 1 and a second image forming mode in which the rotational peripheral speed ratio is greater than 1, and the control unit controls the drive unit so that a difference between developing voltage and supply voltage is greater in the second image forming mode than that in the first image forming mode.

11 Claims, 4 Drawing Sheets

(56) References Cited

U.S. PATENT DOCUMENTS

| | | | | |
|---|---|---|---|---|
| 6,978,108 | B2 | 12/2005 | Sakamaki | |
| 7,058,325 | B2 | 6/2006 | Hamby et al. | |
| 7,873,289 | B2 | 1/2011 | Shin | |
| 7,885,564 | B2 | 2/2011 | Handa et al. | |
| 8,391,737 | B2 | 3/2013 | Ozeki | |
| 9,057,976 | B2 | 6/2015 | Yoshida et al. | |
| 9,244,420 | B2 | 1/2016 | Yanagi | |
| 9,785,111 | B2 | 10/2017 | Suzuki | |
| 10,018,939 | B2 | 7/2018 | Shindo et al. | |
| 10,018,951 | B2 | 7/2018 | Saito et al. | |
| 10,754,273 | B2 * | 8/2020 | Mochizuki | G03G 15/0266 |
| 10,809,655 | B2 | 10/2020 | Kume et al. | |
| 2006/0127133 | A1 * | 6/2006 | Suzuki | G03G 15/5008 399/236 |
| 2008/0310868 | A1 | 12/2008 | Shin | |
| 2009/0245870 | A1 | 10/2009 | Ueno | |
| 2009/0274491 | A1 * | 11/2009 | Sato | G03G 15/0867 399/281 |
| 2010/0054780 | A1 * | 3/2010 | Kitamura | G03G 15/065 399/55 |
| 2010/0266301 | A1 * | 10/2010 | Ohshika | G03G 15/5008 399/167 |
| 2011/0026957 | A1 * | 2/2011 | Ozeki | G03G 15/0266 399/167 |
| 2014/0044446 | A1 * | 2/2014 | Tsukada | G03G 15/0848 399/121 |
| 2014/0119757 | A1 * | 5/2014 | Yoshida | G03G 15/065 399/55 |
| 2017/0031314 | A1 | 2/2017 | Suzuki | |
| 2017/0235249 | A1 * | 8/2017 | Shindo | G03G 15/0865 399/53 |
| 2017/0277067 | A1 * | 9/2017 | Noguchi | G03G 15/065 |
| 2017/0277068 | A1 * | 9/2017 | Naito | G03G 15/5008 |
| 2019/0101845 | A1 * | 4/2019 | Hirata | G03G 15/04 |
| 2020/0041955 | A1 * | 2/2020 | Nakai | G03G 21/203 |
| 2020/0310316 | A1 * | 10/2020 | Tomishi | G03G 15/5004 |

FOREIGN PATENT DOCUMENTS

| | | | | |
|---|---|---|---|---|
| CN | 101324766 | A | 12/2008 | |
| CN | 101546145 | A | 9/2009 | |
| CN | 101592902 | A | 12/2009 | |
| CN | 106406047 | A | 2/2017 | |
| JP | 61-42672 | A | 3/1986 | |
| JP | 8-248715 | A | 9/1996 | |
| JP | 2001-075358 | A | 3/2001 | |
| JP | 2001-125334 | A | 5/2001 | |
| JP | 2002-169369 | A | 6/2002 | |
| JP | 2006-084824 | A | 3/2006 | |
| JP | 2009-237549 | A | 10/2009 | |
| JP | 2011-033722 | A | 2/2011 | |
| JP | 2014-089245 | A | 5/2014 | |
| JP | 2014126833 | A * | 7/2014 | G03G 15/0858 |
| JP | 2017-032745 | A | 2/2017 | |
| JP | 2017-040714 | A | 2/2017 | |
| JP | 2017-146589 | A | 8/2017 | |
| JP | 2017-181964 | A | 10/2017 | |
| JP | 2020-020875 | A | 2/2020 | |
| JP | 2020-046481 | A | 3/2020 | |

OTHER PUBLICATIONS

Office Action dated Sep. 23, 2024, in Chinese Patent Application No. 202210756407.1.

Office Action dated Jan. 7, 2025, in Japanese Patent Application No. 2021-110887.

Office Action dated Mar. 26, 2025, in Chinese Patent Application No. 202210756407.1.

* cited by examiner

IMAGE FORMING APPARATUS

BACKGROUND OF THE INVENTION

Field of the Invention

The present invention relates to an image forming apparatus.

Description of the Related Art

In an image forming apparatus, such as a copier, a printer, and a facsimile machine, that uses an electrophotographic image forming system (electrophotographic process), an electrophotographic photosensitive member (hereinafter called a "photosensitive member") serving as an image bearing member is uniformly charged by charging means, and the charged photosensitive member is exposed to form an electrostatic image on the photosensitive member. The electrostatic image formed on the photosensitive member is visualized as a toner image through the toner of a developer by developing means. Then, the toner image formed on the photosensitive member is transferred onto a recording material such as a recording sheet and a plastic sheet. In addition, heat and pressure are applied to the toner image transferred onto the recording material. Thus, the toner image is fixed onto the recording material to perform image recording.

Such an image forming apparatus generally requires the replenishment of a developer or the maintenance of various process means. In order to facilitate the replenishment operation of the developer or the maintenance of the process means, a technology to incorporate a photosensitive member, charging means, developing means, cleaning means for cleaning the photosensitive member or the like, etc., into a cartridge inside a frame body to be used as a process cartridge attachable to and detachable from an image forming apparatus body has been put into practical use. According to a process cartridge system, it is possible to provide an image forming apparatus having excellent usability.

In recent years, the high density of images or the enhancement of tones has been demanded as one of wide-ranging market demands for the purpose of obtaining richer images. To this end, there has been a technology to provide a mode for varying the peripheral speed ratio between a photosensitive drum and a developing roller in addition to a mode for obtaining general image density, increasing the amount of a developer supplied to the photosensitive drum, and increasing the amount of the developer on a recording material to realize high density or the enhancement of a tone (Japanese Patent Application Laid-open No. 2017-181964).

SUMMARY OF THE INVENTION

However, it is required that the number of rotations of a photosensitive drum or a developing roller be increased along with the speeding-up of a process in recent years. If the number of rotations of the photosensitive drum or the developing roller increases, a variation in torque or the vibration of a developing container is likely to occur, which results in the unstable rotation of the developing roller. The unstable rotation of the developing roller leads to a variation in the rotational peripheral speed ratio between the developing roller and the photosensitive drum, and density irregularity called banding occurs in an image in some cases.

The present invention has been made in view of the above problem and has an object of providing an image forming apparatus having a plurality of modes each having a different rotational peripheral speed ratio between a photosensitive drum and a developing roller, wherein the image forming apparatus is capable of forming a high quality image while suppressing the occurrence of banding in any of the modes.

The present invention provides an image forming apparatus comprising:

an image bearing member configured to be rotatable;

a developer bearing member configured to be rotatable and develop an electrostatic latent image with a developer at a nip region formed between the developer bearing member and the image bearing member;

a drive unit configured to rotationally drive the image bearing member and the developer bearing member so that peripheral speeds thereof are individually varied;

a control unit configured to control the drive unit;

a developing voltage application unit configured to apply a developing voltage to the developer bearing member;

a supply member configured to supply a developer to the developer bearing member; and a supply member voltage application unit configured to apply a supply voltage to the supply member, wherein the control unit is configured to control so as to be capable of executing a first image forming mode in which a rotational peripheral speed ratio representing a ratio between a surface movement speed of the developer bearing member and a surface movement speed of the image bearing member is not more than 1 and a second image forming mode in which the rotational peripheral speed ratio is larger than 1, and the control unit is configured to control so that a difference between the developing voltage and the supply voltage becomes larger in a case in which the control unit executes the second image forming mode than a case in which the control unit executes the first image forming mode.

The present invention also provides an image forming apparatus comprising: an image bearing member configured to be rotatable;

a developer bearing member configured to be rotatable and develop an electrostatic latent image with a developer at a nip region formed between the developer bearing member and the image bearing member;

a drive unit configured to rotationally drive the image bearing member and the developer bearing member so that peripheral speeds thereof are individually varied;

a control unit configured to control the drive unit;

a developer container configured to accommodate a developer to be supplied to the developer bearing member; and a conveyance member arranged inside the developer container and configured to rotate about a rotation shaft to stir and convey the developer, wherein the control unit is configured to control so as to be capable of executing a first image forming mode in which a rotational peripheral speed ratio representing a ratio between a surface movement speed of the developer bearing member and a surface movement speed of the image bearing member is not more than 1 and a second image forming mode in which the rotational peripheral speed ratio is larger than 1, and the control unit is configured to control so that a rotational speed of the conveyance member is varied between a case in which the control unit executes the first image forming mode and a case in which the control unit executes the second image forming mode.

According to the present invention, it is possible to provide an image forming apparatus having a plurality of modes each having a different rotational peripheral speed ratio between a photosensitive drum and a developing roller, wherein the image forming apparatus is capable of forming a high quality image while suppressing the occurrence of banding in any of the modes.

Further features of the present invention will become apparent from the following description of exemplary embodiments with reference to the attached drawings.

DESCRIPTION OF THE EMBODIMENTS

Hereinafter, with reference to the drawings, an embodiment for carrying out the present invention will be exemplarily described in detail on a basis of examples. However, the dimensions, materials, shapes, and their relative arrangements, or the like of constituting components described in the embodiment should be appropriately modified according to the configurations or various conditions of an apparatus to which the present invention is applied unless otherwise specifically noted. That is, the scope of the present invention is not limited to the following embodiment.

EMBODIMENT

Image Forming Apparatus

Figure 1:
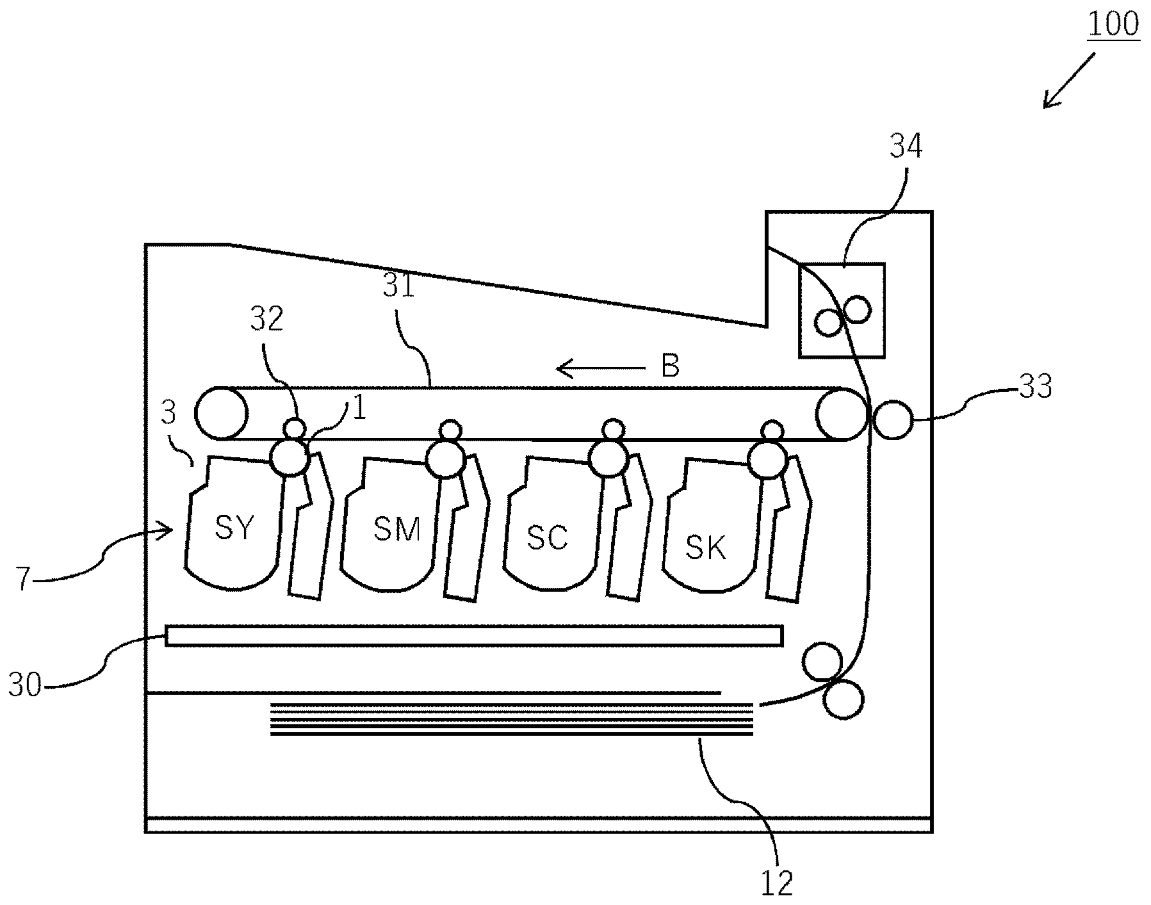
FIG. 1 is a cross-sectional view showing the schematic configuration of an image forming apparatus according to the present invention.

The entire configuration of an electrophotographic image forming apparatus (hereinafter called an image forming apparatus) according to an embodiment will be described. FIG. 1 is a cross-sectional view of an image forming apparatus 100 according to the embodiment. The image forming apparatus 100 is a full-color laser beam printer employing an in-line system and an intermediate transfer system. The image forming apparatus 100 is capable of forming a full-color image on a recording material (for example, a recording sheet, a plastic sheet, a fabric, or the like) according to image information. The image information is input to an image forming apparatus body from an image reading apparatus connected to the image forming apparatus body or a host device such as a personal computer communicably connected to the image forming apparatus body.

In the image forming apparatus 100, a plurality of process cartridges 7 have image forming units SY, SM, SC, and SK to form images of the respective colors of yellow (Y), magenta (M), cyan (C), and black (K). In the embodiment, the image forming units SY, SM, SC, and SK are arranged in a line in a direction crossing a vertical direction.

The process cartridges 7 are attachable to and detachable from the image forming apparatus 100 via installation means such as an attachment guide and a positioning member provided in the image forming apparatus body. In the embodiment, the process cartridges for the respective colors have the same shape, and the toner of the respective colors of yellow (Y), magenta (M), cyan (C), and black (K) is accommodated in the process cartridges 7 for the respective colors. Note that the process cartridges will be described in the embodiment but developing apparatuses 3 may be configured to be independently attachable to and detachable from the image forming apparatus body.

Photosensitive drums 1 are rotationally driven by drive means (drive source) not shown. A scanner unit 30 (exposure means) is arranged around the photosensitive drums 1. The scanner unit 30 is exposure means for applying laser light on the basis of image information and forming an electrostatic image (electrostatic latent image) on the photosensitive drums 1. The writing of laser exposure is performed according to a position signal called BD (Beam Detect) inside a polygon scanner for each scanning line in a main scanning direction (a direction orthogonal to the conveyance direction of a recording material 12). On the other hand, the writing of laser exposure is performed after a prescribed time delay since a TOP signal with a switch (not shown) in the conveyance path of the recording material 12 as a starting point in a sub-scanning direction (conveyance direction of the recording material 12). Thus, the laser exposure is consistently allowed at the same positions on the photosensitive drums 1 in four process stations Y, M, C, and K.

An intermediate transfer belt 31 serving as an intermediate transfer member for transferring toner images on the photosensitive drums 1 onto the recording material 12 is arranged facing the four photosensitive drums 1. The intermediate transfer belt 31 formed of an endless belt serving as an intermediate transfer member contacts all the photosensitive drums 1 and circularly moves (rotates) in a direction (counterclockwise direction) indicated by arrow B in FIG. 1. On the side of the inner peripheral surface of the intermediate transfer belt 31, four primary transfer rollers 32 serving as primary transfer means are arranged side by side so as to face the respective photosensitive drums 1. Then, a bias having polarity opposite to the normal charging polarity of the toner is applied from a primary transfer bias power supply (high pressure power supply) (not shown) serving as primary transfer bias applying means to the primary transfer rollers 32. Thus, the toner images on the photosensitive drums 1 are transferred (primarily transferred) onto the intermediate transfer belt 31.

Further, a secondary transfer roller 33 serving as secondary transfer means is arranged on the side of the outer peripheral surface of the intermediate transfer belt 31. Then, a bias having polarity opposite to the normal charging polarity of the toner is applied from a secondary transfer bias power supply (high pressure power supply) (not shown) serving as secondary transfer bias applying means to the secondary transfer roller 33. Thus, the toner images on the intermediate transfer belt 31 are transferred (secondarily transferred) onto the recording material 12. For example, the above processes are successively performed in the image forming units SY, SM, SC, and SK when a full-color image is formed, whereby toner images of the respective colors are primarily transferred onto the intermediate transfer belt 31 so as to overlap each other.

After that, the recording material 12 is conveyed to a secondary transfer region in synchronization with the movement of the intermediate transfer belt 31. Then, the toner images of the four colors on the intermediate transfer belt 31 are collectively and secondarily transferred onto the recording material 12 by the operation of the secondary transfer roller 33 contacting the intermediate transfer belt 31 via the recording material 12.

The recording material 12 onto which the toner images have been transferred is conveyed to a fixing apparatus 34 serving as fixing means. When heat and pressure are applied onto the recording material 12 by the fixing apparatus 34, the toner images are fixed onto the recording material 12.

Process Cartridge

Figure 2:
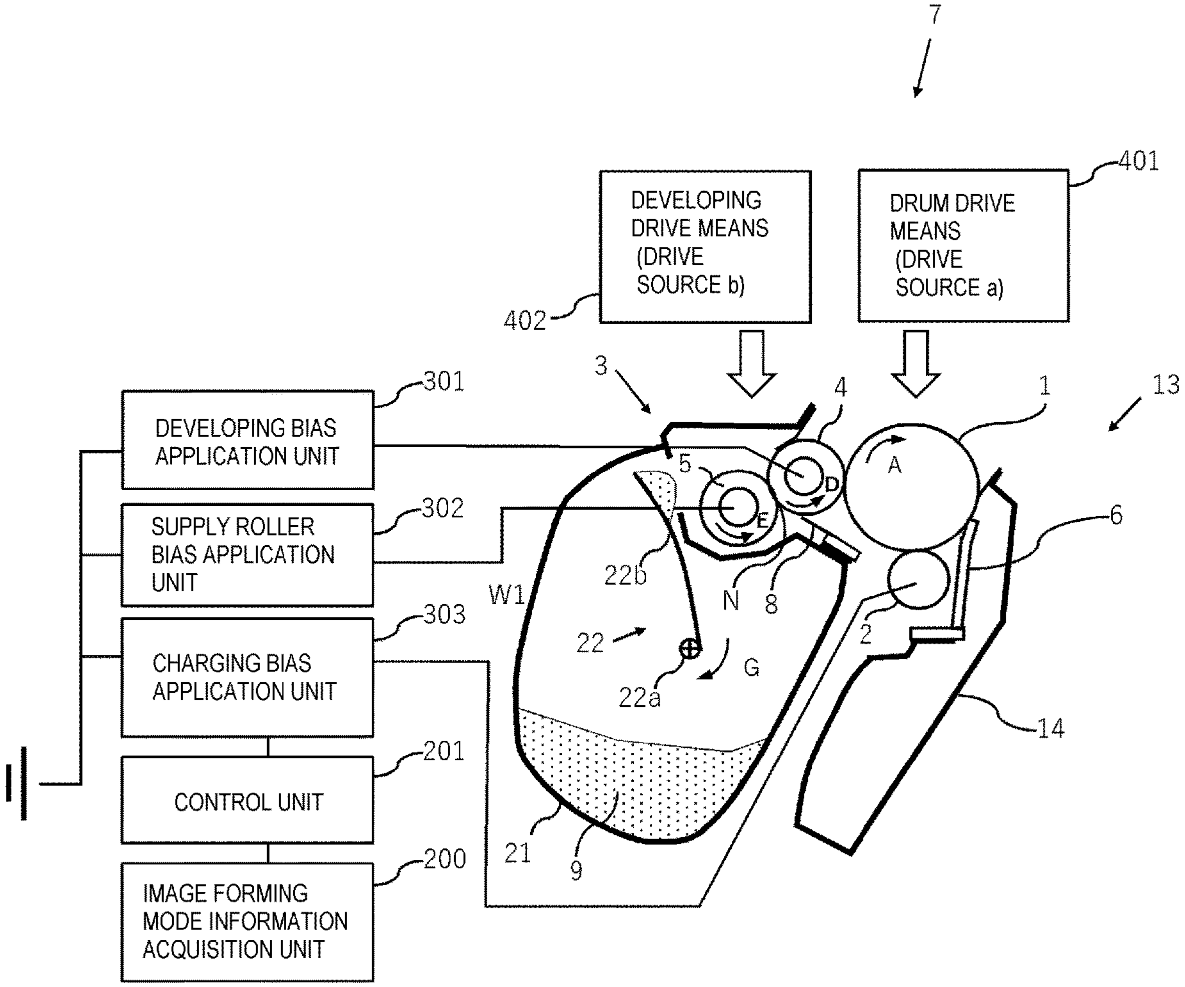
FIG. 2 is a cross-sectional view showing the schematic configuration of a cartridge according to the present invention.

The entire configuration of the process cartridges 7 attached to the image forming apparatus 100 according to the embodiment will be described. FIG. 2 is a cross-sectional view (main cross-sectional view) of one of the process cartridges 7 according to the embodiment when seen along the longitudinal direction (rotational central axis line direction) of the photosensitive drum 1. Note that the configurations and operations of the process cartridges 7 for the respective colors are substantially the same except for the types (colors) of accommodated toner in the embodiment.

The process cartridge 7 has a photosensitive unit 13 including the photosensitive drum 1 or the like serving as an image bearing member and a developing unit 3 including a developing roller 4 or the like serving as a developer bearing member.

The photosensitive drum 1 is rotatably attached to the photosensitive unit 13 via a bearing not shown. The photosensitive drum 1 is rotationally driven in a (clockwise) direction indicated by arrow A in FIG. 2 according to an image forming operation when receiving the drive force of a drive motor serving as drum drive means 401 (drive source a). In the embodiment, an organic photosensitive drum in which an undercoat layer, a carrier generation layer, and a carrier transfer layer serving as functional films are successively coated on the outer peripheral surface of an aluminum cylinder is used as the photosensitive drum 1 playing a central role in an image forming process.

Further, a charging roller 2 and a cleaning blade 6 serving as a cleaning member are arranged in the photosensitive unit 13 so as to touch the peripheral surface of the photosensitive drum 1. The cleaning blade 6 contacts the photosensitive drum 1 in a counter form, and residual toner removed from the surface of the photosensitive drum 1 by the cleaning blade 6 is dropped and accommodated in a cleaning frame body 14.

The charging roller 2 serving as a charging member is driven to rotate when a roller portion formed of conductive rubber comes in pressure-contact with the photosensitive drum 1. Here, a prescribed DC voltage is applied to the cored bar of the charging roller 2 from a charging bias application unit 303 (charging voltage application means) serving as a high-pressure power supply. Thus, a uniform dark-part potential (Vd) is formed on the surface of the photosensitive drum 1.

When a spot pattern of laser light emitted from the scanner unit 30 described above so as to correspond to image data exposes the charged photosensitive drum 1, charges on the surface disappear in an exposed segment due to carriers from the carrier generation layer and a potential reduces. As a result, an electrostatic latent image having a prescribed bright-part potential (V1) at the exposed segment and a prescribed dark-part potential (Vd) as a surface potential at an unexposed segment is formed on the photosensitive drum 1.

On the other hand, the developing unit 3 is formed of a toner accommodation container serving as a developer container for accommodating a non-magnetic one-component developer (toner 9) as a developer. In the toner accommodation container, the developing roller 4 serving as a developer bearing member for bearing the toner 9 and a supply roller 5 serving as a supply member for supplying the toner 9 to the developing roller 4 are arranged. Further, a developing blade 8 that controls the amount of the toner supplied by the supply roller 5 and coated on the developing roller 4, and that applies charges to the toner is arranged.

The developing blade 8 is formed of a thin plate-shaped member, forms a contact pressure using the spring elasticity of a thin plate, and touches and contacts the toner 9 and the developing roller 4 through its surface. The toner 9 is charged by friction when the developing blade 8 and the developing roller 4 rub against each other, and its thickness is controlled simultaneously with the application of charges. Further, a prescribed voltage is applied to the developing blade 8 from a blade bias power supply not shown to stabilize the coating of the toner in the embodiment.

Further, a toner accommodation chamber 21 is arranged in a direction in which the toner scraped off the developing roller 4 by the developing blade 8 is dropped. The toner is accommodated in the toner accommodation chamber 21. Further, a toner conveyance member 22 for stirring and conveying the toner 9 is provided inside the toner accommodation chamber 21. That is, the toner conveyance member 22 stirs the toner 9 accommodated in the toner accommodation chamber 21 and conveys the toner 9 in a direction indicated by arrow G in FIG. 2 toward the upper region of the toner supply roller 5.

The toner conveyance member 22 is formed of a rotation shaft **22*a* and a conveyance sheet 22*b*. The conveyance sheet 22*b* is attached over a substantially entire area in the axis line direction (longitudinal direction) of the rotation shaft 22*a*. The conveyance sheet 22*b* is a rectangle-shaped sheet member and may be fabricated using a flexible resin sheet such as a polyester film and a polycarbonate film having a thickness of 50 μm to 250 μm. Further, a length in the rotation radius direction of the rotation shaft 22*a* of the conveyance sheet 22*b* in a natural state is set to be longer than a distance from the rotation center of the rotation shaft 22*a* to a wall surface W1 of the toner accommodation chamber 21** in the same direction.

The developing roller 4 is configured to be provided with an elastic layer formed of a conductive elastic body so as to have a diameter of 12 mm on the outer peripheral surface of a SUS (stainless steel) cored bar. In the embodiment, polyurethane rubber is employed as the elastic body. The developing roller 4 touches and contacts the photosensitive drum 1. The developing roller 4 and the photosensitive drum 1 rotate so that their surfaces move in the same direction (direction from the bottom to the top in the embodiment) at a facing region (contact region). That is, the developing roller 4 rotates in a direction indicated by arrow D. In the embodiment, the developing roller 4 is set to have hardness lower than that of the photosensitive drum 1 and arranged so that its intrusion amount becomes 50 μm.

In order to maintain a uniform contact nip with the photosensitive drum 1, the elastic rubber layer of the developing roller 4 that has a hardness of not more than 50° as MD-1 hardness measured by an MD-1 durometer manufactured by KOBUNSHI KEIKI CO., LTD is preferably used. If the MD-1 hardness is too high, it becomes difficult to substantially ensure the contact nip with the photosensitive drum 1. As a result, the effect of the present invention is hardly obtained. In the embodiment, the elastic rubber layer having a rubber hardness of 38° is used.

Further, the developing roller 4 is set to have a surface roughness of at least 1.4 μm as center line average roughness Ra, whereby the required amount of the toner 9 is maintained on the surface of the developing roller 4. If the center line average roughness Ra is smaller than 1.4 μm, it becomes impossible to develop the sufficient amount of the toner 9 on the photosensitive drum 1. As a result, sufficient image density is hardly obtained. In the embodiment, the developing roller 4 having a center line average roughness of 2.0 is used. The center line average roughness Ra is measured by a "surfcoder SE 350" manufactured by Kosaka Laboratory Ltd.

In the embodiment, with respect to a prescribed DC bias (Vdc) applied to the developing roller 4 from a developing bias application unit 301 (developing voltage application means) serving as a high voltage power supply, the toner 9 negatively charged by friction charges moves only to a bright-part potential region and visualizes an electrostatic latent image due to its potential difference at a developing region at which the toner 9 touches the photosensitive drum 1. The difference between a DC bias Vdc and a bright-part potential V1 is called developing contrast, and the size of the developing contrast is changed to control the amount of the toner developed from the developing roller to the photosensitive drum 1 and control image density, a line width, or the like.

The supply roller 5 is disposed on the peripheral surface of the developing roller 4 so as to form a prescribed contact region (nip region) N. Further, the supply roller 5 is an elastic sponge roller in which a foam layer is formed on the outer periphery of a conductive cored bar, and the supply roller 5 and the developing roller 4 contact each other with a prescribed intrusion amount. Here, the intrusion amount represents a recessed amount ΔE obtained when the toner supply roller 5 is deformed into a recessed shape by the developing roller 4. In the embodiment, the amount of the supply roller 5 intruded into the developing roller 4, that is, the recessed amount ΔE with which the supply roller 5 is deformed into a recessed shape by the developing roller 4 is set at 1 mm.

Further, at the contact region N at which the supply roller 5 faces the developing roller 4, the supply roller 5 rotates in a direction indicated by arrow E in FIG. 2 so that their surfaces move in opposite directions. Thus, the supply roller 5 supplies the toner 9 to the developing roller 4 while collecting residual toner on the developing roller 4. Note that the supply roller 5 may rotate in a direction opposite to the direction indicated by the arrow E.

Further, a prescribed DC bias (supply voltage) is applied to the supply roller 5 from a supply roller bias application unit 302 (supply member voltage application means) serving as a high voltage power supply, whereby the negatively-charged toner 9 is easily supplied from the supplied roller 5 to the developing roller 4.

About Occurrence of Banding

Here, the occurrence of banding in an image will be discussed. A banding image occurs due to a variation in the rotational peripheral speed ratio between the photosensitive drum 1 and the developing roller 4. The rotational peripheral speeds of the photosensitive drum 1 and the developing roller 4 may be expressed by the respective surface movement speeds of these members. The rotational peripheral speed ratio between the developing roller 4 and the photosensitive drum 1 may be expressed as the ratio between the surface movement speed of the developing roller 4 and the surface movement speed of the photosensitive drum 1. The variation in the rotational peripheral speed ratio between the photosensitive drum 1 and the developing roller 4 occurs in, for example, the following case.

In the embodiment, the toner conveyance member 22 and the developing roller 4 are coupled to each other by gears not shown and configured to drive when receiving the drive force of a drive motor serving as developing drive means 402 (drive source b). Accordingly, the developing roller 4 and the toner conveyance member 22 simultaneously rotate in the embodiment. The peripheral speed of the toner conveyance member 22 increases as the peripheral speed of the developing roller 4 increases. The developing drive means 402 and the drum drive means 401 described above may be grasped as a drive unit that operates according to the control of a control unit 201 that will be described later.

Figure 4A:
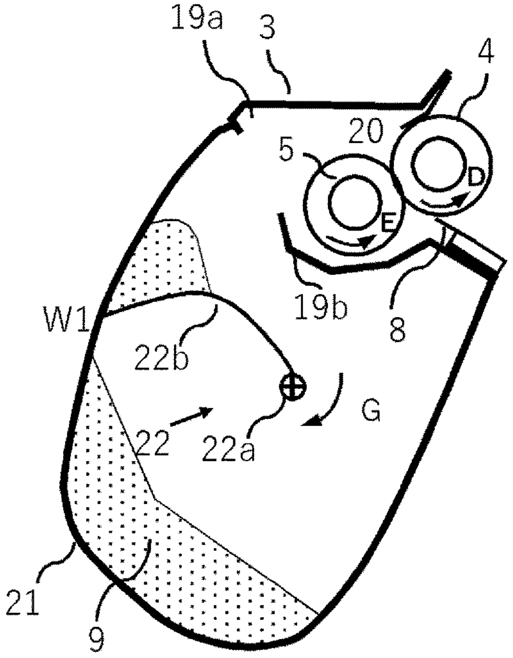
FIGS. 4A and 4B are views for describing a case in which a load on a toner conveyance sheet changes according to the present invention.
Figure 4B:
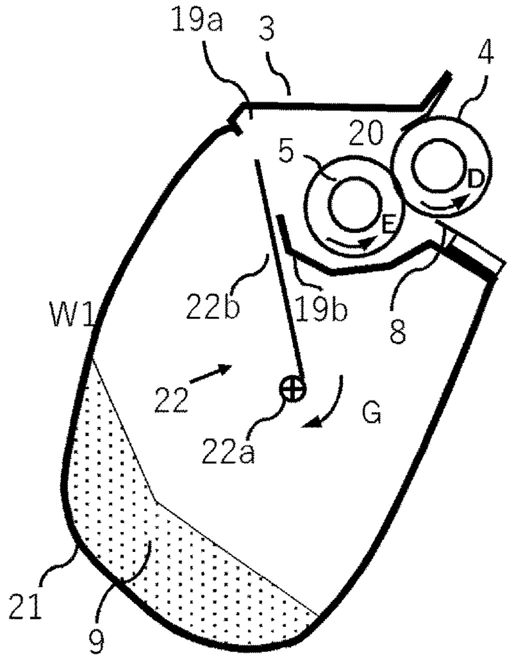

A case in which a load on the conveyance sheet **22*b* of the toner conveyance member 22 changes will be described using FIGS. 4A and 4B. As shown in FIG. 4A, the load becomes maximum in a state in which the conveyance sheet 22*b* contacts the wall surface W1 of the toner accommodation chamber 21 and deforms during its rotation and in which the toner 9 is laid in the upper region of the conveyance sheet 22*b*. On the other hand, as shown in FIG. 4B, the load becomes minimum in a state in which the conveyance sheet 22*b* is released from its deformation state and restored to its natural state (original shape) by the elastic restoration force of the conveyance sheet 22*b*** itself.

When the load on the conveyance sheet **22*b* changes as described above, a load applied to the developing roller 4 via the coupling gears changes and the rotational peripheral speed of the developing roller 4 temporarily fluctuates in some cases. As a result, the rotational peripheral speed ratio between the photosensitive drum 1 and the developing roller 4 varies. Thus, the amount of the toner developed from the developing roller 4 to the photosensitive drum 1** changes, which results in the occurrence of a banding image.

Here, when the rotational peripheral speed ratio between the developing roller 4 and the photosensitive drum 1 is not more than 1, that is, when the photosensitive drum 1 rotates faster than the developing roller 4, a force acts in a direction in which the photosensitive drum 1 assists the rotation of the developing roller 4. That is, when the rotational vibration of the developing roller 4 is likely to occur, a force for assisting the rotation of the developing roller 4 acts on the developing roller 4 from the photosensitive drum 1. As a result, the rotational vibration of the developing roller 4 is suppressed, which makes it possible to prevent the occurrence of a banding image.

On the other hand, when the rotational peripheral speed ratio between the developing roller 4 and the photosensitive drum 1 is larger than 1, that is, when the developing roller 4 rotates faster than the photosensitive drum 1, the force for assisting the rotation of the developing roller 4 does not act on the developing roller 4 from the photosensitive drum 1 in a case in which the rotational vibration of the developing roller 4 is likely to occur. Therefore, the rotational vibration of the developing roller 4 easily occurs. In this case, a process speed is reduced with the rotational peripheral speed ratio between the developing roller 4 and the photosensitive drum 1 maintained, which makes it possible to loosen a variation in torque, suppress the rotational vibration of the developing roller 4, and prevent the occurrence of banding.

Note that the toner conveyance member 22 and the developing roller 4 are configured to drive when receiving the drive force of the drive motor serving as the developing drive means 402 (drive source b) in the embodiment but may independently drive.

Further, in the embodiment, the peripheral speed of the developing roller 4 is set to be smaller in a mode (a high density mode that will be described later) in which the rotational peripheral speed ratio between the developing roller 4 and the photosensitive drum 1 is larger than 1, compared with a mode (a normal mode that will be described later) in which the rotational peripheral speed ratio between the developing roller 4 and the photosensitive drum 1 is not more than 1. Thus, the rotational peripheral speed of the toner conveyance member 22 also becomes small as described above. Therefore, it is possible to loosen a variation in torque and prevent the occurrence of banding.

Further, in the embodiment, the peripheral speed of the developing roller 4 is set to be smaller in the high density mode in which the rotational peripheral speed ratio between the developing roller 4 and the photosensitive drum 1 is larger than 1, compared with the normal mode in which the rotational peripheral speed ratio between the developing roller 4 and the photosensitive drum 1 is not more than 1. A configuration in which the rotational peripheral speed of the toner conveyance member 22 also becomes small as described above is employed in the embodiment, but other configurations may be employed. For example, in an image forming mode (that will be described later) for increasing the rotational peripheral speed ratio between the photosensitive drum 1 and the developing roller 4 to obtain high density or an increase in the selection range of a tone, the rotational speed of the toner conveyance member 22 may be controlled to be large. By setting the rotational speed of the toner conveyance member 22 to be larger compared with the normal mode in which the rotational peripheral speed ratio between the developing roller 4 and the photosensitive drum 1 is not more than 1 after reducing the peripheral speed of the developing roller 4 to a certain degree to suppress the occurrence of banding, it is possible to improve the ability to convey the toner. That is, the rotational speed of the toner conveyance member 22 may be increased to provide the ability to convey the toner to correspond to a high-density image that will be described later.

are controlled by the control unit 201 on the basis of information obtained by an image forming mode information acquisition unit 200. The image forming mode information acquisition unit 200 acquires information or the like input from an operating panel or a printer driver not shown in the image forming apparatus 100 or a host PC.

As the control unit 201, a control circuit or a computer having a computing resource such as a processor and a memory is, for example, available. The control unit 201 is used to perform various control relating to image formation such as exposure control, voltage control, and drive control. The control unit 201 is also capable of variably controlling the rotational speed of the toner conveyance member 22 described above.

For example, the control unit 201 is capable of variably controlling the peripheral speed at which the developing roller 4 is rotationally driven through the control of the drive force of the drive motor serving as the developing drive means 402. The control unit 201 is also capable of variably controlling the peripheral speed at which the photosensitive drum 1 is rotationally driven or is capable of individually and variably controlling the peripheral speeds of the developing roller 4 and the photosensitive drum 1 through the control of the drive force of the drive motor serving as the drum drive means 401. The above configuration allows the control unit 201 to vary the rotational peripheral speed ratio between the developing roller 4 and the photosensitive drum 1 and execute the first mode in which the rotational peripheral speed ratio is not more than 1 and the second mode in which the rotational peripheral speed ratio is larger than 1. The control unit 201 may also control (perform control) so that the surface movement speed of the photosensitive drum 1 in the second mode becomes smaller than that of the photosensitive drum 1 in the first mode.

TABLE 1

| | DARK-PART POTENTIAL Vd (V) | BRIGHT-PART POTENTIAL Vl (V) | DEVELOPING POTENTIAL Vdc (V) | SUPPLY ROLLER BIAS (V) | ROTATIONAL PERIPHERAL SPEED RATIO | ROTATIONAL PERIPHERAL SPEED OF PHOTO-SENSITIVE DRUM (mm/sec) |
|---|---|---|---|---|---|---|
| NORMAL | −500 | −100 | −350 | −500 | 0.9 | 300 |
| MODE | −500 | −100 | −350 | −500 | 0.9 | 300 |
| HIGH DENSITY | −700 | −150 | −500 | −700 | 1.2 | 100 |
| MODE | −700 | −150 | −500 | −700 | 1.2 | 100 |

Image Forming Modes

The image forming apparatus according to the embodiment is capable of operating in two image forming modes. A first mode (first image forming mode) is an image forming mode (hereinafter called a "normal mode") for obtaining normal image density. A second mode (second image forming mode) is an image forming mode (hereinafter called a "high density mode") for increasing the rotational peripheral speed ratio between the photosensitive drum 1 and the developing roller 4 to obtain high density or an increase in the selection range of a tone while reducing a dark-part potential on the photosensitive drum.

A difference in the specific control between the normal mode and the high density mode in the embodiment is shown in the following table 1. Here, biases applied by the developing bias application unit 301, the supply roller bias application unit 302, and the charging bias application unit 303 and the amount of laser light from the scanner unit 30

In the embodiment, the rotational peripheral speed ratio represents the rotational peripheral speed of the developing roller 4 when the rotational peripheral speed of the photosensitive drum 1 is assumed as 1. Specifically, the rotational peripheral speed of the photosensitive drum 1 is set at 300 mm/sec, and the rotational peripheral speed of the developing roller 4 is set at 270 mm/sec in the normal mode. That is, a relationship in which the rotational peripheral speed of the developing roller 4 is smaller than that of the photosensitive drum 1 in the normal mode is established. By the establishment of the relationship, the photosensitive drum 1 assists the rotation of the developing roller 4. As a result, it is possible to suppress the occurrence of banding. In order to substantially express the function and effectively reduce the occurrence of banding due to a variation in the rotational peripheral speed of the developing roller 4, the rotational peripheral speed ratio is desirably set to be not more than 0.95.

Further, in order to obtain substantial density in the normal mode, the rotational peripheral speed is desirably set to be at least 0.7.

Figure 3:
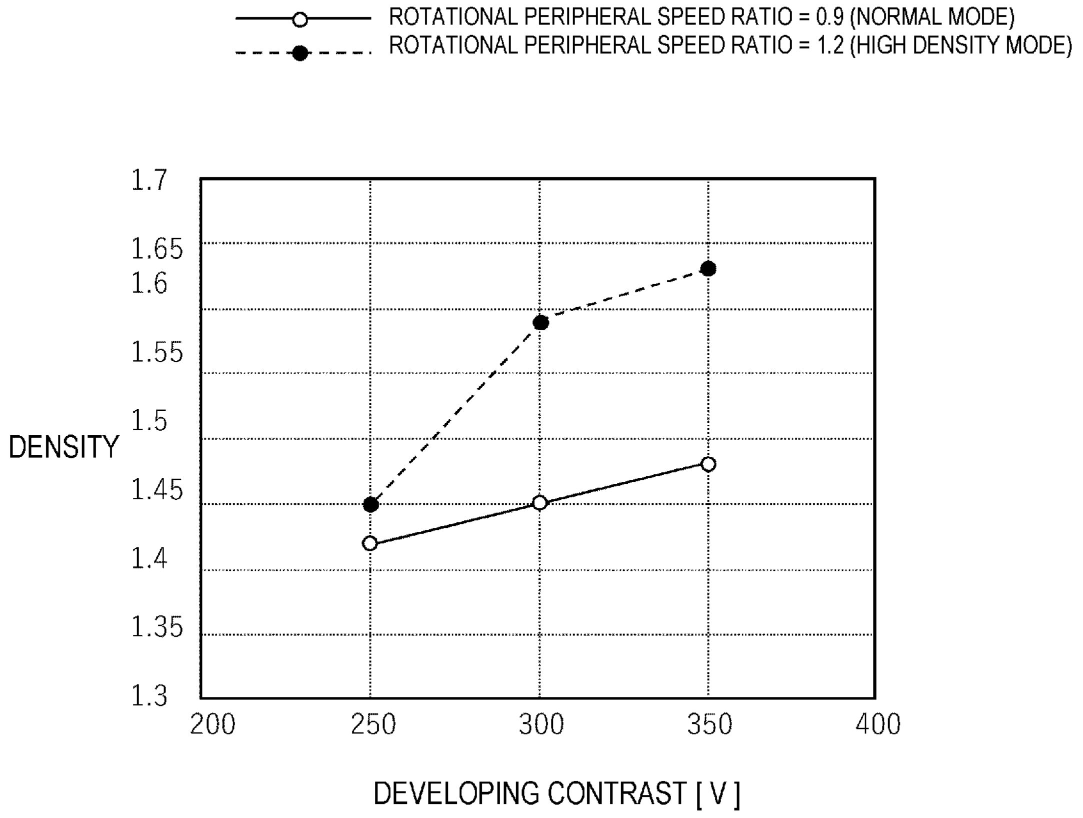
FIG. 3 is a graph for describing the relationship between developing contrast and image density according to the present invention.

On the other hand, the rotational peripheral speed of the photosensitive drum 1 is set at 100 mm/sec, and the rotational peripheral speed of the developing roller 4 is set at 120 mm/sec in the high density mode. This is because the amount of the toner developed from the developing roller 4 to the photosensitive drum 1 becomes larger and image density becomes higher with respect to the same developing contrast when the rotational peripheral speed of the developing roller 4 is larger than that of the photosensitive drum 1 as shown in FIG. 3. Thus, it is possible to obtain density required in the high density mode without degrading the quality of characters. In the high density mode, the rotational peripheral speed ratio is desirably not more than 1.5. This is because the rotational peripheral speed of the developing roller 4 becomes faster as the rotational peripheral speed ratio becomes larger and therefore banding due to a variation in the rotational peripheral speed of the developing roller 4 is likely to occur.

Further, in the embodiment, the value of developing contrast in the high density mode is set to be larger than that of the developing contrast in the normal mode as shown in FIG. 3. Thus, it is possible to obtain higher density and a further increase in the selection range of a tone in the high density mode.

Further, in both the normal mode and the high density mode, a supply roller bias is applied so that the difference between a developing potential and the supply roller bias creates a negative electric field in a toner supply direction. In addition, the difference between the developing potential and the supply roller bias is set to be larger in the high density mode than in the normal mode. Thus, it is possible to increase the amount of the toner supplied to the developing roller in the high density mode and obtain higher density. In addition, it is possible to prevent the shortage of the amount of the toner supplied due to the continuous printing of a high density image.

In the configuration and the control described above, the process speed is reduced in such a manner as to reduce the respective rotational peripheral speeds of the developing roller 4 and the photosensitive drum 1 while maintaining a state in which the developing roller 4 rotates faster than the photosensitive drum 1 in the high density mode. Thus, a variation in torque is loosened, and the rotational vibration of the developing roller 4 is suppressed. As a result, it is possible to prevent the occurrence of banding. Accordingly, it is possible to set the normal mode and the high density mode in the embodiment to the control shown in table 1 and provide a high quality image requested by a user while preventing the occurrence of banding.

Experiments

In order to verify the above effect, the following verification experiment was conducted. Under a temperature of 23° C. and a humidity of 50%, a two-sheet-intermittent printing durability test was conducted. In the printing durability test, an E-character having an image ratio of 1% was printed. In this mode, 30,000 prints were printed, a half-tone image was printed periodically, and the occurrence of horizontal streaks due to banding was confirmed. "x" shows that horizontal streaks occurred, while "o" shows that horizontal streaks did not occur.

Further, solid black was printed in the high density mode, and the density of the solid black was measured using SPECTRO DENSITOMETER 500 manufactured by X-Rite.

Further, in order to make a comparison with the effect of the present configuration, the experiments of comparative examples 1 to 3 of which the control values were changed from the values of the embodiment were conducted.

TABLE 2

| | NORMAL MODE | | HIGH DENSITY MODE | |
|---|---|---|---|---|
| | ROTATIONAL PERIPHERAL SPEED RATIO | ROTATIONAL SPEED OF PHOTOSENSITIVE DRUM (mm/sec) | ROTATIONAL PERIPHERAL SPEED RATIO | ROTATIONAL SPEED OF PHOTOSENSITIVE DRUM (mm/sec) |
| EMBODIMENT | 0.9 | 300 | 1.2 | 100 |
| COMPARATIVE EXAMPLE 1 | 1.2 | 300 | 1.2 | 100 |
| COMPARATIVE EXAMPLE 2 | 0.9 | 300 | 1.2 | 300 |
| COMPARATIVE EXAMPLE 3 | 0.9 | 300 | 0.9 | 100 |

In comparative example 1, the rotational peripheral speed ratio in the normal mode was changed to 1.2. In comparative example 2, the rotational speed of the photosensitive drum in the high density mode was changed to 300 ms/sec. In comparative example 3, the rotational peripheral speed ratio in the high density mode was changed to 0.9.

Table 3 shows results. In banding evaluation, "x" shows that horizontal streaks occurred due to banding, while "o" shows that horizontal streaks did not occur. In density evaluation based on the measurement of solid black in the high density mode, "o" shows that density was at least 1.5, while "x" shows that density was not more than 1.5.

TABLE 3

| | BANDING EVALUATION | | DENSITY EVALUATION |
|---|---|---|---|
| | NORMAL MODE | HIGH DENSITY MODE | HIGH DENSITY MODE |
| EMBODIMENT | ○ | ○ | ○ |
| COMPARATIVE EXAMPLE 1 | x | ○ | ○ |
| COMPARATIVE EXAMPLE 2 | ○ | x | ○ |
| COMPARATIVE EXAMPLE 3 | ○ | ○ | x |

In the configuration of the embodiment, it was possible to suppress the occurrence of banding in both the normal mode and the high density mode and obtain required density in the high density mode.

On the other hand, in the configuration of comparative example 1, the rotational speed of the developing roller 4 was larger than that of the photosensitive drum 1 in the normal mode. Therefore, the photosensitive drum 1 did not assist the rotation of the developing roller 4 when rotation irregularity occurred in the developing roller 4. As a result, a banding image occurred.

Further, in the configuration of comparative example 2, the rotational speed of the photosensitive drum 1 in the high density mode remained the same as that of the photosensitive drum 1 in the normal mode. Therefore, it was not possible to loosen a variation in torque and suppress the rotational vibration of the developing roller 4. As a result, a banding image occurred.

Further, in the configuration of comparative example 3, it was possible to suppress the occurrence of a banding image. However, since the toner 9 was not substantially supplied in the high density mode, it was not possible to obtain required density.

As described above, the rotational peripheral speed ratio is set so that the rotational speed of the developing roller 4 becomes smaller than that of the photosensitive drum 1 in the normal mode, whereby it is possible to suppress the occurrence of a banding image even where irregularity is likely to occur in the rotational peripheral speed of the developing roller 4. Further, the process speed is reduced even where the rotational speed of the developing roller 4 is set to be faster than that of the photosensitive drum 1 in the high density mode, whereby it is possible to suppress the occurrence of a banding image. With the two modes, it is possible to respond to the need of a user requesting a high density image while suppressing the occurrence of a banding image.

According to the present invention, the image forming apparatus having the plurality of modes each having a different rotational peripheral speed ratio between the photosensitive drum 1 and the developing roller 4 is allowed to form a high quality image while suppressing the occurrence of banding in both modes. Accordingly, in both the normal mode for obtaining general image density and the high density mode for realizing high density or the enhancement of a tone, it is possible to achieve density requested by a user while suppressing the banding of an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-110887, filed Jul. 2, 2021, which is hereby incorporated by reference herein in its entirety.

What is claimed is:

1. An image forming apparatus capable of executing a first image forming mode and a second image forming mode for forming an image on a recording material, the image forming apparatus comprising:

an image bearing member configured to be rotatable;

a developer bearing member configured to be rotatable and develop an electrostatic latent image with a developer charged to a normal polarity at a nip region formed between the developer bearing member and the image bearing member;

a supply member configured to supply the developer to the developer bearing member;

a drive unit configured to rotationally drive the image bearing member and the developer bearing member so that peripheral speeds thereof are individually varied;

a developer container configured to accommodate the developer to be supplied to the developer bearing member;

a conveyance sheet arranged inside the developer container and configured to rotate about a rotation shaft to stir and convey the developer and configured to be rotatable between a first phase in which the conveyance sheet contacts the inside of the developing container and a second phase in which the conveyance sheet does not contact the inside of the developing container; and a control unit configured to control the drive unit, wherein the control unit is configured to control so as to be capable of executing the first image forming mode in which a rotational peripheral speed ratio representing a ratio between a surface movement speed of the developer bearing member and a surface movement speed of the image bearing member is not greater than 1 and the second image forming mode in which the rotational peripheral speed ratio is greater than 1, and the control unit is configured to control so that the rotational speed of the conveyance sheet is higher in the case in which the control unit executes the second image forming mode than that in the case in which the control unit executes the first image forming mode.

2. The image forming apparatus according to claim 1, wherein the control unit is configured to control so that the surface movement speed of the image bearing member is slower in the case in which the control unit executes the second image forming mode than that in the case in which the control unit executes the first image forming mode.

3. The image forming apparatus according to claim 1, wherein the control unit is configured to control so that the rotational peripheral speed ratio between the developer bearing member and the image bearing member is not greater than 0.95 in the first image forming mode.

4. The image forming apparatus according to claim 3, wherein the control unit is configured to control so that the rotational peripheral speed ratio between the developer bearing member and the image bearing member is at least 0.7 in the first image forming mode.

5. The image forming apparatus according to claim 1, wherein the control unit is configured to control so that the rotational peripheral speed ratio between the developer bearing member and the image bearing member is not greater than 1.5 in the second image forming mode.

6. The image forming apparatus according to claim 1, further comprising:

an exposure unit configured to expose a surface of the image bearing member on a basis of image information and form an electrostatic latent image; and a developing voltage application unit configured to apply a developing voltage of the normal polarity to the developer bearing member, wherein the control unit is configured to control so that a difference between the developing voltage and a surface potential formed on the surface of the image bearing member when the surface is exposed by the exposure unit is greater in the case in which the control unit executes the second image forming mode than that in the case in which the control unit executes the first image forming mode.

7. The image forming apparatus according to claim 1, wherein the control unit is configured to control so that the surface movement speed of the developer bearing member is slower in the case in which the control unit executes the second image forming mode than that in the case in which the control unit executes the first image forming mode.

8. The image forming apparatus according to claim 1, wherein a color gamut in the second image forming mode is wider than the color gamut in the first image forming mode.

9. The image forming apparatus according to claim 8, wherein the first image forming mode is a normal mode for obtaining normal image density.

10. The image forming apparatus according to claim 8, wherein the second image forming mode, which is a wider gamut mode, is for increasing a range of the color gamut.

11. The image forming apparatus according to claim 1, wherein the normal polarity is a negative polarity.

* * * * *